United States Patent
Hung et al.

(10) Patent No.: US 9,538,626 B1
(45) Date of Patent: Jan. 3, 2017

(54) LIGHTING CONTROL SYSTEM

(71) Applicant: Lumani Limited, Taipei (TW)

(72) Inventors: Chi Lung Hung, New Taipei (TW); Shao Chueh Huang, New Taipei (TW)

(73) Assignee: Lumani Limited, Taipei (TW)

( * ) Notice: Subject to any disclaimer, the term of this patent is extended or adjusted under 35 U.S.C. 154(b) by 0 days.

(21) Appl. No.: 15/099,658

(22) Filed: Apr. 15, 2016

(51) Int. Cl.
*H01J 7/44* (2006.01)
*H01Q 1/26* (2006.01)
*H05B 37/02* (2006.01)

(52) U.S. Cl.
CPC ...... *H05B 37/0281* (2013.01); *H05B 37/0218* (2013.01); *H05B 37/0227* (2013.01); *H05B 37/0272* (2013.01)

(58) Field of Classification Search
CPC .................. H05B 33/02; G08B 23/00
USPC ......... 315/33–35; 340/501, 502, 517, 815.45
See application file for complete search history.

(56) References Cited

U.S. PATENT DOCUMENTS

| | | | |
|---|---|---|---|
| 8,610,377 B2 * | 12/2013 | Chemel | H05B 37/029 315/297 |
| 2015/0120598 A1 * | 4/2015 | Fadell | G06Q 10/083 705/333 |

* cited by examiner

*Primary Examiner* — Minh D A
(74) *Attorney, Agent, or Firm* — Alan D. Kamrath; Kamrath IP Lawfirm, P.A.

(57) ABSTRACT

A lighting control system comprises a smart device, at least one luminaire assembly, and a server. A user operates a client app installed on the smart device to communicatively with the server to further control the at least one luminaire assembly. The server comprises a database module, a brightness control module for implementing automatic brightness variations, a mode switching module for cooperating with at least sensor disposed in the at least one luminaire assembly to implement different ambient lighting controls, and a brightness compensation module for cooperating with a light sensor disposed on the smart device to implement ambient lighting control.

14 Claims, 8 Drawing Sheets

LIGHTING CONTROL SYSTEM

BACKGROUND OF THE INVENTION

1. Field of the Invention

The present invention relates to lighting control and, more particularly, to a lighting control system.

2. Description of the Prior Art

A conventional lighting control system comprises luminaires, a gateway, a server, and a remote controller. The luminaires are wired to the gateway, and the gateway is wired or wirelessly connected to the server. A user may use the remote controller to transfer commands to the server, and then the server controls, via the gateway, the luminaires according to the commands. However, the conventional lighting control system has some disadvantages as follows.

First, the installation is inconvenient because the luminaires are connected to the gateway via physical wiring so that the amount of the physical wiring increases as the number of the luminaires increases, resulting in the increased complexity of the installation. Second, brightness variations of the luminaires are inadequate because the turn-on or turn-off of the luminaires is only controlled by the user so that the brightness of the luminaires does not automatically vary. Third, the conventional lighting control system is still focused on manually controlling the lighting. Users still have to monitor and operate the system by the remote controller. Fourth, the cost would be increased. If an additional function such as ambient lighting control is requested, additional components such as light sensors and additional wiring are needed, resulting in the increased complexity of the installation. Fifth, the conventional lighting control system has a narrow range of applications because it simply introduces a wireless network into a more conventional manual-switching lighting control system.

SUMMARY OF THE INVENTION

The present invention is adapted to providing a lighting control system to improve the aforementioned disadvantages.

According to an aspect of the present invention, there is provided a lighting control system comprising a smart device, at least one luminaire assembly, and a server communicatively connected to the smart device and the at least one luminaire assembly. The smart device comprises a client app installed thereon and a light sensor disposed thereon. The at least one luminaire assembly comprises a plurality of luminaires set into at least one luminaire group via the client app to be controlled in groups. The server comprises a database module, a brightness control module, a mode switching module, a brightness compensation module, and a global positioning system (GPS) module. The database module stores parameter settings set via the client app, operating data gathered from the at least one luminaire assembly, and at least one GPS location of the at least one luminaire assembly. The brightness control module controls the at least one luminaire assembly to provide different brightness variations at different times according to the parameter settings obtained from the database module, property occupancy by the GPS module, and an ambient variation detected by the at least one luminaire assembly. The mode switching module controls the at least one luminaire assembly to switch between different operating modes according to the operating data obtained from the database module and the ambient variation detected by the at least one luminaire assembly. The brightness compensation module compensates the brightness of the at least one luminaire assembly by comparing a luminance setting of the at least one luminaire assembly with an ambient luminance detected by the light sensor of the smart device. The GPS module compares a GPS location of the smart device with the at least one GPS location of the at least one luminaire assembly to decide whether the smart device is in a user-defined range of the at least one luminaire assembly to automatically turn on or off the at least one luminaire assembly.

According to another aspect of the present invention, each luminaire assembly further comprises a gateway, at least one lighting controller, and at least one sensor. The gateway is communicatively connected to the server. The at least one lighting controller is communicatively connected to the gateway and electrically connected to at least one of the plurality of luminaires. The at least one sensor is electrically connected to the at least one lighting controller for detecting the ambient variation.

According to another aspect of the present invention, the client app comprises a group page, a schedule page, an advanced page, and a setting page. The group page is provided for a user to set and turn on or off the at least one luminaire group. The schedule page is provided for the user to set the parameter settings to arrange actions of the at least one luminaire group. The advanced page is provided for the user to set a software electric meter and a connection between the gateway and the at least one lighting controller. The setting page is provided for the user to set parameters related to the group page, the schedule page, and the advanced page.

According to another aspect of the present invention, the group page comprises at least one group control button displayed thereon each for controlling corresponding one of the at least one luminaire group to turn on or off or dim.

According to another aspect of the present invention, the software electric meter is provided to calculate energy consumption of the at least one luminaire assembly and set a usage limitation on the energy consumption of the at least one luminaire assembly.

According to another aspect of the present invention, the client app activates the light sensor of the smart device to periodically detect the ambient luminance, and activates a network communication function of the smart device to communicatively connect to the server to compare the ambient luminance with the luminance setting to compensate the brightness of the at least one luminaire assembly.

According to another aspect of the present invention, the server is wirelessly connected to the smart device and the at least one luminaire assembly.

According to another aspect of the present invention, the parameter settings and the operating data are stored for different users in the database module.

According to another aspect of the present invention, the at least one sensor detects people flow to transfer to the server to store as the operating data in the database module, wherein the mode switching module analyzes the people flow to control the at least one luminaire assembly to automatically switch between the operating modes comprising a busy mode, a sensor mode, a silent mode, and a security mode.

According to another aspect of the present invention, the smart device comprises a smart phone, a phablet, or a tablet.

According to another aspect of the present invention, the parameter settings comprises a time range setting, a brightness variation setting, and a group range setting. The time range setting is used for determining when the luminaire group is turned on or off or dimmed or armed for security.

The brightness variation setting is used for determining the dimming of brightness of the luminaire group. The group range setting is used for determining which luminaire is set into the luminaire group.

According to another aspect of the present invention, the at least one GPS location of the at least one luminaire assembly comprises a GPS location of the gateway. The user-defined range of the at least one luminaire assembly comprises a user-defined range of the gateway's location.

According to another aspect of the present invention, the user-defined range of the gateway's location comprises a circle having a user-defined radius.

According to another aspect of the present invention, the client app further comprises a sign-in button. When the sign-in button is pressed and the smart device is in the user-defined range, the server records sign-in and sign-out times of the smart device to the database module. The server provides how many smart devices are in the user-defined range by extracting information about the sign-in and sign-out times stored in the database module.

By using the lighting controllers between the gateway and the luminaires and the group page, the installation becomes convenient. By using the schedule page and the brightness control module, brightness variations are automatically implemented via software without additional components and wiring thereof. By using the light sensor of the smart device and the brightness compensation module, ambient lighting control may be implemented without additional components and wiring thereof. By big data collection using the sensors and the mode switching module, behavior and brightness of the lighting may automatically vary as ambient variations occur to implement ambient lighting control. By using the software electric meter, it broadens the range of applications without additional components and wiring thereof.

The foregoing, as well as additional objects, features and advantages of the present invention will be more readily apparent from the following embodiments and detailed description, which proceed with reference to the accompanying drawings.

DESCRIPTION OF THE PREFERRED EMBODIMENTS

The terminology used herein is for the purpose of describing particular embodiments only and is not intended to limit the present invention. As used herein, the singular forms "a", "an," and "the" are intended to include the plural forms as well unless the context clearly indicates otherwise. Moreover, the terms "comprises" and "comprising" specify the presence of stated features, integers, steps, operations, and/or components, but do not preclude the presence or addition of one more other features, integers, steps, operations, and/or components.

Figure 1:
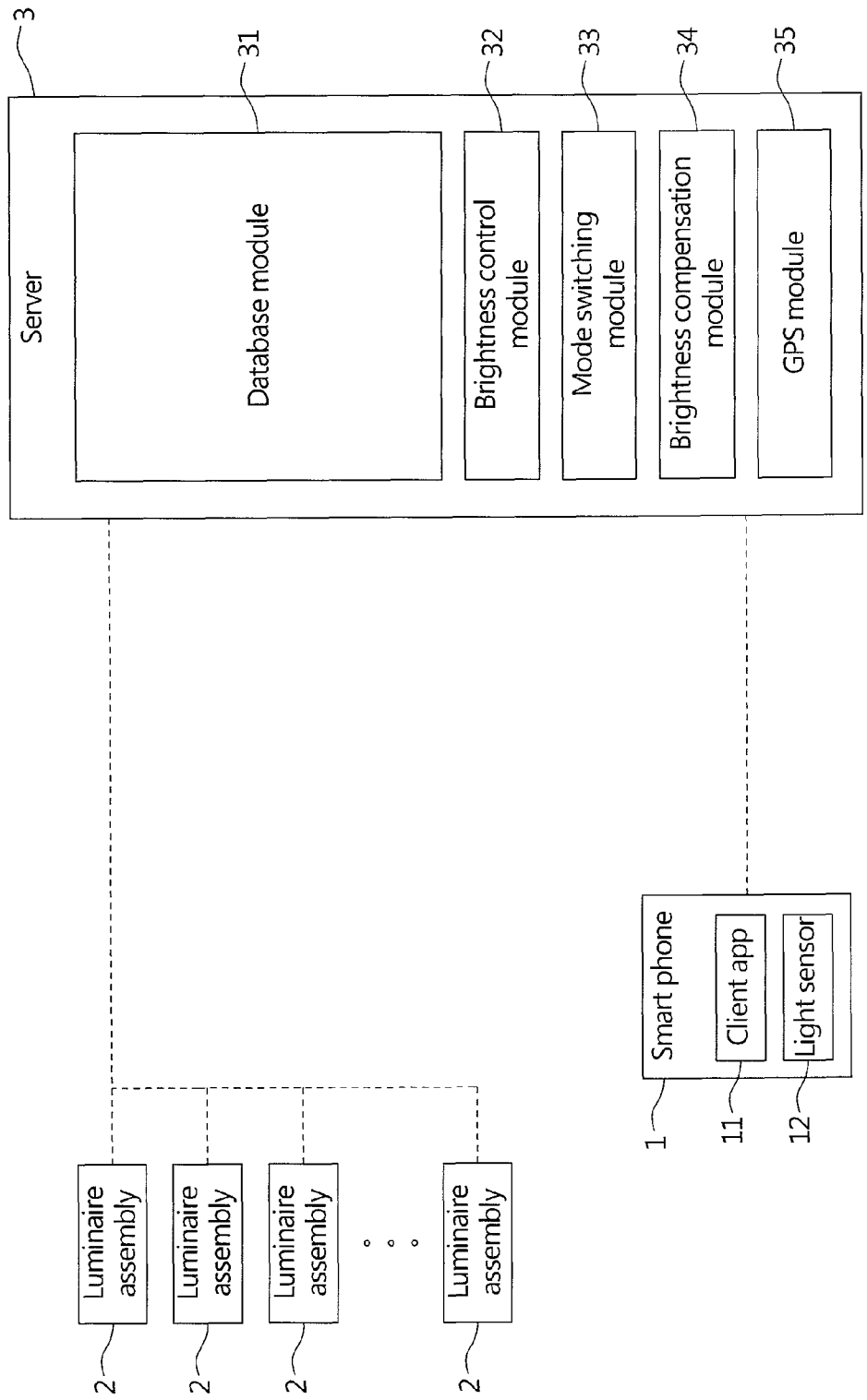
FIG. 1 shows a schematic diagram of a lighting control system according to an embodiment of the present invention.

Referring to FIG. 1, there is shown a schematic diagram of a lighting control system according to an embodiment of the present invention. The lighting control system comprises a smart phone 1, luminaire assemblies 2, and a server 3 wirelessly connected to the smart phone 1 and the luminaire assemblies 2. The smart phone 1 comprises a client app 11 installed thereon and a light sensor 12 disposed thereon; the server 3 comprises a database module 31, a brightness control module 32, a mode switching module 33, a brightness compensation module 34, and a GPS module 35 which are implemented by software programs. The embodiment is not intended to limit the present invention. In an alternative embodiment, the smart phone 1 may be a smart device such as a phablet or tablet; the number of the luminaire assemblies 2 may be one; the server 3 may be wired to the luminaire assemblies 2.

Figure 2:
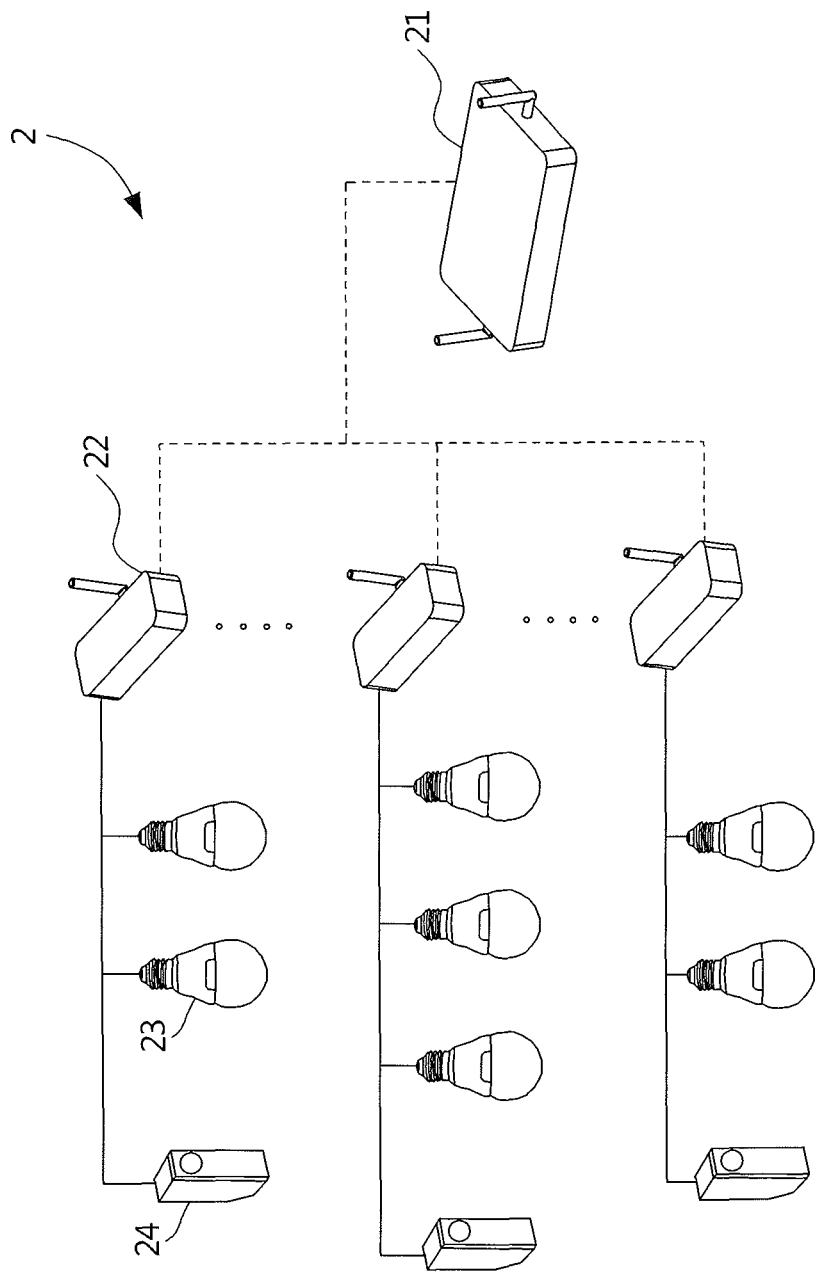
FIG. 2 shows a schematic diagram of a luminaire assembly according to an embodiment of the present invention.

Referring further to FIG. 2, there is shown a schematic diagram of the luminaire assembly 2 shown in FIG. 1. The luminaire assembly 2 comprises a gateway 21, lighting controllers 22, luminaires 23, and sensors 24. The gateway 21 is wirelessly connected to the server 3 and serves as a communication interface in the luminaire assembly 2 for communicating with the server 3; the lighting controllers 22 are wirelessly connected to the gateway 21 and are wired to the luminaires 23 and the sensors 24. The sensors 24 detect ambient variations such as people flow. The sensors 24 may comprise at least one occupancy sensor using infrared, ultrasonic, microwave, or camera technology. The embodiment is not intended to limit the present invention. In an alternative embodiment, the number of the lighting controllers 22, the luminaires 23, or the sensors 24 may be one; the lighting controllers 22 may be wirelessly connected to the sensors 24.

By using the lighting controllers 22 between the gateway 21 and the luminaires 23, during the installation, only the connections between the luminaires 23 and the lighting controllers 22 should be considered without considering the connections between the luminaires 23 and the gateway 21 so that the installation becomes convenient and the quick blind installation may be implemented. For example, an installation person only needs to consider that the luminaires 23 related to some lighting controller 22 are not arranged across two inappropriate zones, for example, two rooms having a wall disposed therebetween, and then plans all luminaires 23 via the client app 11 so that the amount of the physical wiring greatly decreases and, accordingly, the complexity of the installation greatly decreases.

Figure 3:
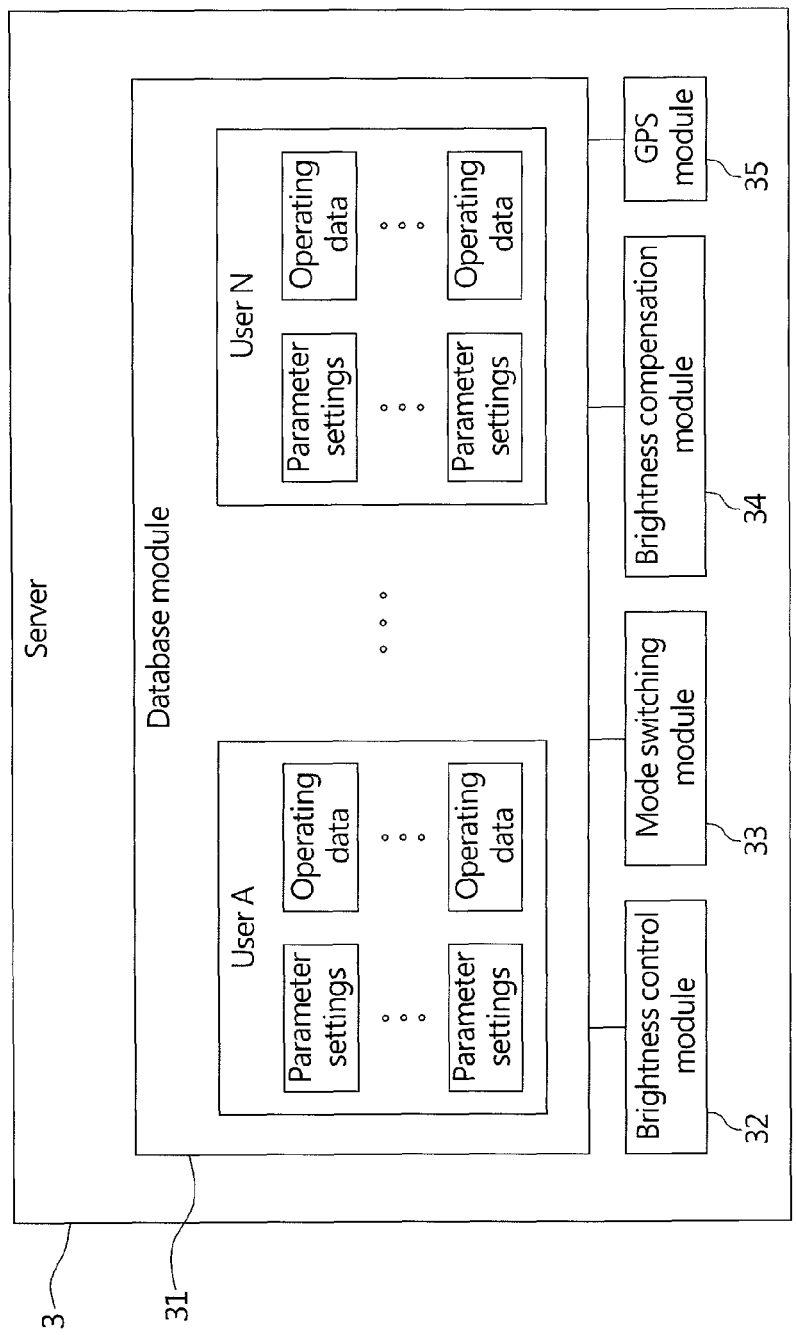
FIG. 3 shows a schematic diagram of a server according to an embodiment of the present invention.

Referring further to FIG. 3, there is shown a schematic diagram of the server 3 shown in FIG. 1. In the server 3, the database module 31 stores parameter settings set via the client app 11, operating data gathered from the detection of the sensors 24 of the luminaire assemblies 2, and GPS locations of the luminaire assemblies 2. The parameter settings and the operating data are stored for different users, for example, a user A to a user N. The brightness control module 32 controls the luminaire assemblies 2 to provide different brightness variations at different times according to the parameter settings obtained from the database module 31 and an ambient variation detected by the sensors 24 of the luminaire assemblies 2. The mode switching module 33 controls the luminaire assemblies 2 to switch between different operating modes according to the operating data obtained from the database module 31 and the ambient variation detected by the sensors 24 of the luminaire assemblies 2. The brightness compensation module 34 compensates the brightness of the luminaire assemblies 2 by comparing a luminance setting of the luminaire assemblies 2 with an ambient luminance detected by the light sensor 12 of the smart phone 1. The GPS module 35 compares a GPS location of the smart phone 1 with the GPS locations of the luminaire assemblies 2 to decide whether the smart device 1 is in a user-defined range of the luminaire assemblies 2 to automatically turn on or off the luminaire assemblies 2.

Figure 4:
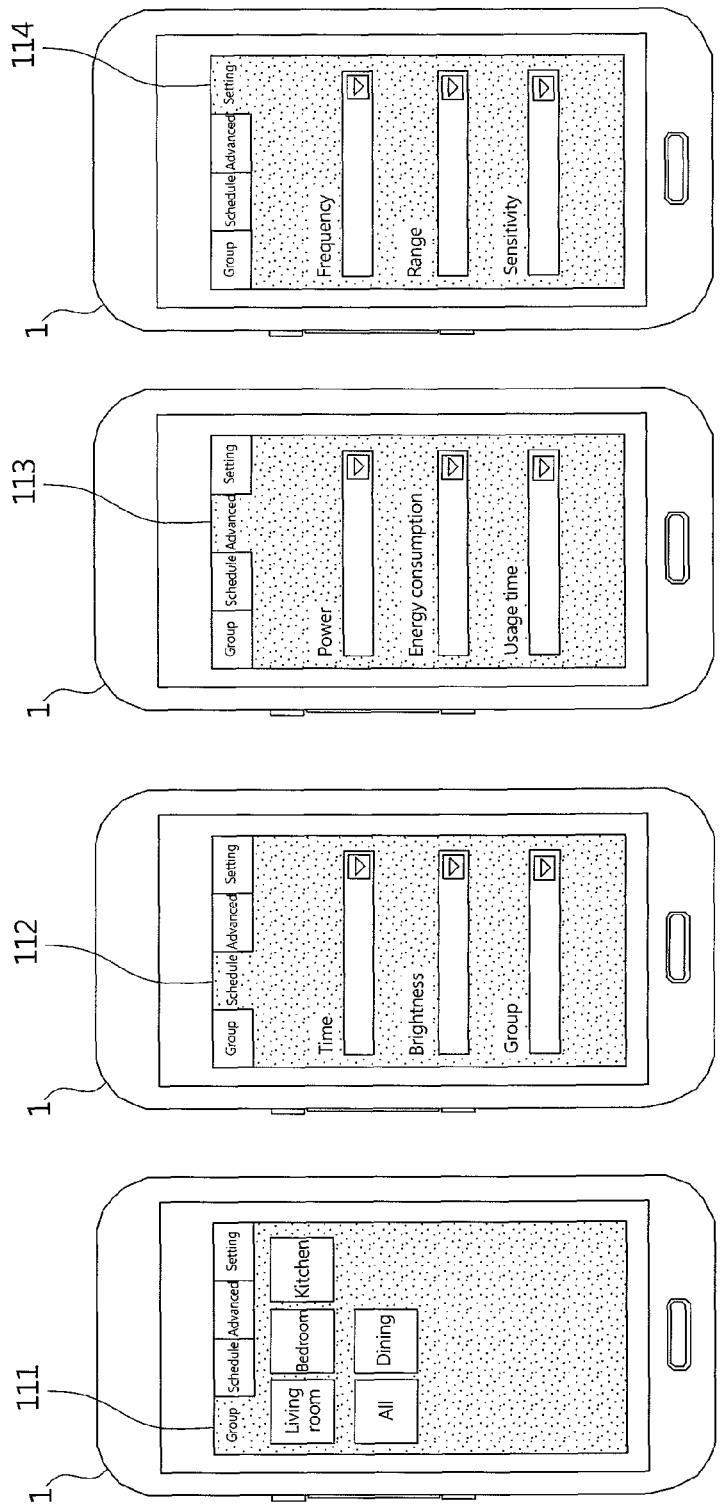
FIG. 4 shows schematic diagrams of pages provided by a client app according to an embodiment of the present invention.

Referring further to FIG. 4, there are shown schematic diagrams of pages provided by the client app 11 shown in FIG. 1. The pages provided by the client app 11 comprise a group page 111, a schedule page 112, an advanced page 113, and a setting page 114.

The group page 111 is provided for a user to set the luminaires 23 of the luminaire assemblies 2 into at least one luminaire group to be controlled in groups. The luminaire group may comprise the luminaires 23 related to different lighting controllers 22, and/or the luminaires 23 related to different luminaire assemblies 2. The group page 111 comprises at least one group control button displayed thereon each for being touched to control a corresponding luminaire group to turn on or off or dim so that the group page 111 is also provided for the user to turn on or off or dim the at least one luminaire group.

In the embodiment, the group page 111 has comprised five group control buttons displayed thereon. For example, a "Living room" group control button is set to control a luminaire group G1 comprising the luminaires disposed in a living room; a "Bedroom" group control button is set to control a luminaire group G2 comprising the luminaires disposed in a bedroom; a "Kitchen" group control button is set to control a luminaire group G3 comprising the luminaires disposed in a kitchen; an "All" group control button is set to control the luminaire groups G1, G2 and G3; a "Dining" group control button is set to control the luminaire groups G1 and G3. When some group control button is activated, this group control button is highlighted, and the luminaires related to this group control button are turned on; when this group control button is inactivated, this group control button has no highlight, and the luminaires related to this group control button are turned off. As the number of the luminaires of the luminaire assemblies increases, this lighting control method may more efficiently control the luminaires.

The schedule page 112 is provided for the user to set the parameter settings to arrange actions of the at least one luminaire group. Each luminaire group comprises its parameter settings comprising a time range setting, a brightness variation setting, and a group range setting. The time range setting is used for setting when the luminaire group is turned on or off or dimmed; the brightness variation setting is used for setting the dimming of brightness; the group range setting is used for setting which luminaires are related to the luminaire group. By using the schedule page 112 provided by the client app 11 (i.e. via software), brightness variations of the luminaire assemblies 2 may be scheduled and automatically performed so that brightness variations are adequate.

The advanced page 113 is provided for the user to set some complex settings such as network settings and sensor settings, wherein the network settings comprise a connection setting between the gateway 21 and the lighting controller 22. The advanced page 113 further provides a software electric meter for calculating energy consumption of the luminaire assemblies 2 and setting a usage limitation on the energy consumption of the luminaire assemblies 2. The user may input rating powers of the luminaires 23 of the luminaire assemblies 2 and corresponding usage times to obtain energy consumption to apply to some applications such as power saving. Compared to a conventional hardware electric meter, the software electric meter does not need additional components and physical wiring thereof so that it may save cost. Moreover, the software electric meter may use the time provided by the server 3 to obtain an objective calculation result of energy consumption.

The setting page 114 is provided for the user to set more parameters related to the group page 111, the schedule page 112, and the advanced page 113. For example, measuring frequency, range, and sensitivity of a sensor may be set in this page.

Figure 5:
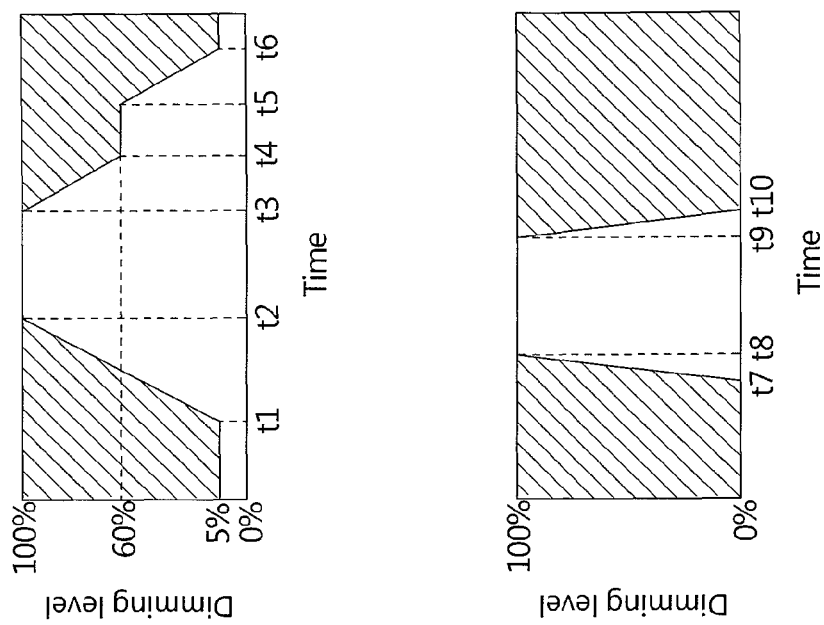
FIG. 5 shows schematic sequence charts of different lighting controls according to an embodiment of the present invention.

Referring further to FIG. 5, there are shown schematic sequence charts of different lighting controls according to an embodiment of the present invention, wherein hatching portions may be considered as power saved, and non-hatching portions may be considered as power consumed. As described above, the brightness control module 32 may control the luminaire assemblies 2 (comprising the luminaires 23) to provide different brightness variations at different times. For example, as shown in the upper chart, in the beginning, luminaires 23 are dimmed to a standby dimming level (e.g. 5%) to provide low brightness. At time t1, while a sensor 24 detects there is a person or few persons, the luminaires 23 are dimmed up at a dim-up speed. At time t2, while the sensor 24 still detects there are persons and then the luminaires 23 are dimmed up to a maximum dimming level (i.e. 100%) to provide the highest brightness, the luminaires 23 are kept in the maximum dimming level for a holding time. At time t3, while the holding time is past and the sensor 24 detects there become few persons or no person, the luminaires 23 are dimmed down at a dim-down speed. At time t4, while the dimming level is down to a specific dimming level (e.g. 60%), the luminaires 23 are kept in this dimming level for another holding time. At time t5, while the holding time is past and the sensor 24 still detects there is no person, the luminaires 23 are dimmed down at the dim-down speed. At time t6, while the dimming level is down to the standby dimming level, the luminaires 23 are kept in the standby dimming level. In an embodiment, if the luminaires 23 are kept in the standby dimming level for a turn-off time, the luminaires 23 are turned off or dimmed to a minimum dimming level (i.e. 0%) to provide no brightness.

Therefore, various lighting controls are implemented by setting dim-up speeds, dim-down speeds, holding times, turn-off times, dimming levels, etc. Taking another example of lighting control, as shown in the lower chart, a very fast dim-up speed used between times t7 and t8 may generate a very fast turn-on for the luminaires so that it may provide a deterrent effect for an intruder. A very fast dim-down speed used between times t9 and t10 may save more power. For the rest of time, there are only two dimming levels, the maximum and minimum dimming levels. This lighting control is particularly well suited to use in warehouses, after-hours offices, etc.

Figure 6:
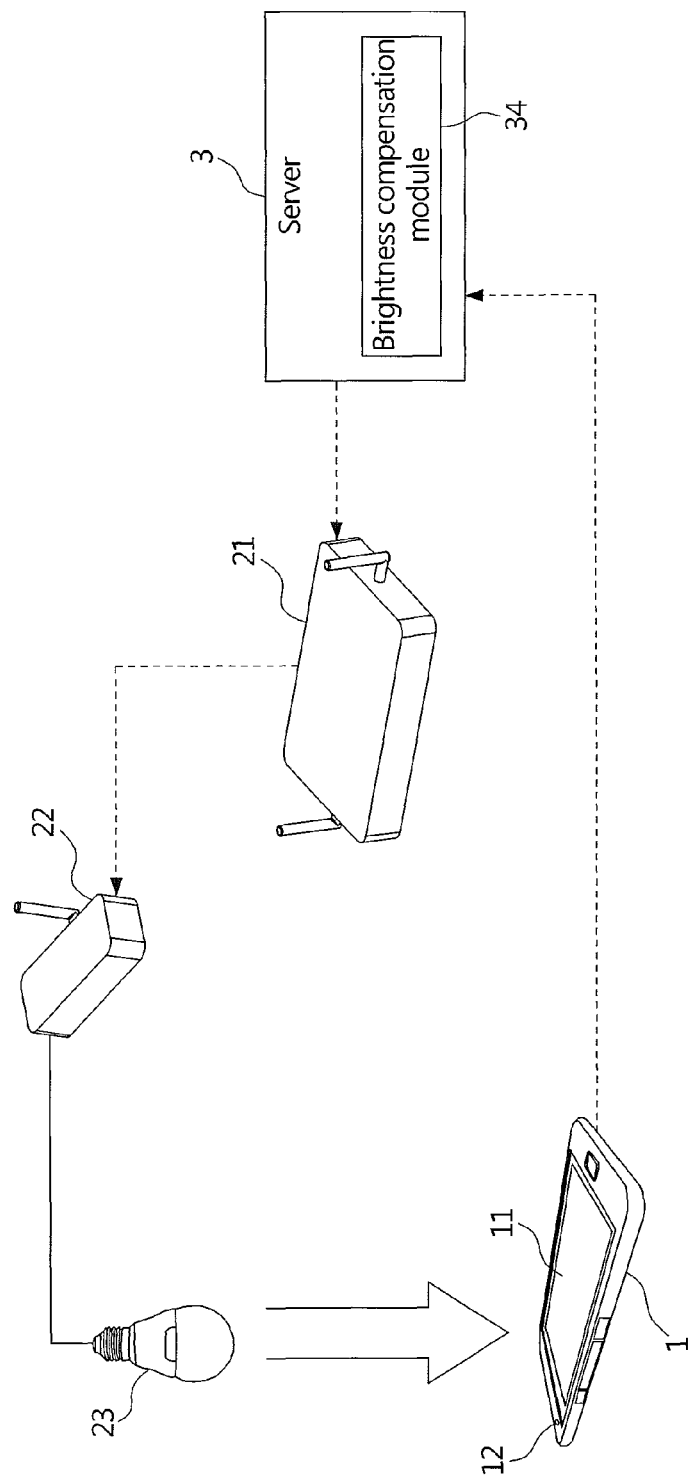
FIG. 6 shows a schematic diagram of brightness compensation using a light sensor of a smart phone according to an embodiment of the present invention.

Referring further to FIG. 6, there is shown a schematic diagram of brightness compensation using the light sensor 12 of the smart phone 1 shown in FIG. 1. As described above, the brightness compensation module 34 may cooperate with light sensor 12 of the smart phone 1 for compensating the brightness of the luminaire assemblies 2 (comprising the luminaires 23). Specifically, the smart phone 1 generally comprises the light sensor 12 disposed thereon, so the user may install the client app 11 on the smart phone 1 for activating the light sensor 12 to periodically detect the ambient luminance and activating a network communication function of the smart phone 1 to transfer the detected ambient luminance to the server 3. The detected ambient luminance generally approximates to the luminance provided by the luminaires 23. The brightness compensation module 34 of the server 3 compares the detected ambient luminance with the luminance setting of the luminaires 23, and controls the luminaires 23 to dim up or down until the detected ambient luminance reaches the luminance setting. By using the light sensor 12 of the smart phone 1 with the brightness compensation module 34, brightness compensation may be automatically implemented via software without using additional components and physical wiring thereof so that it may save cost.

Figure 7:
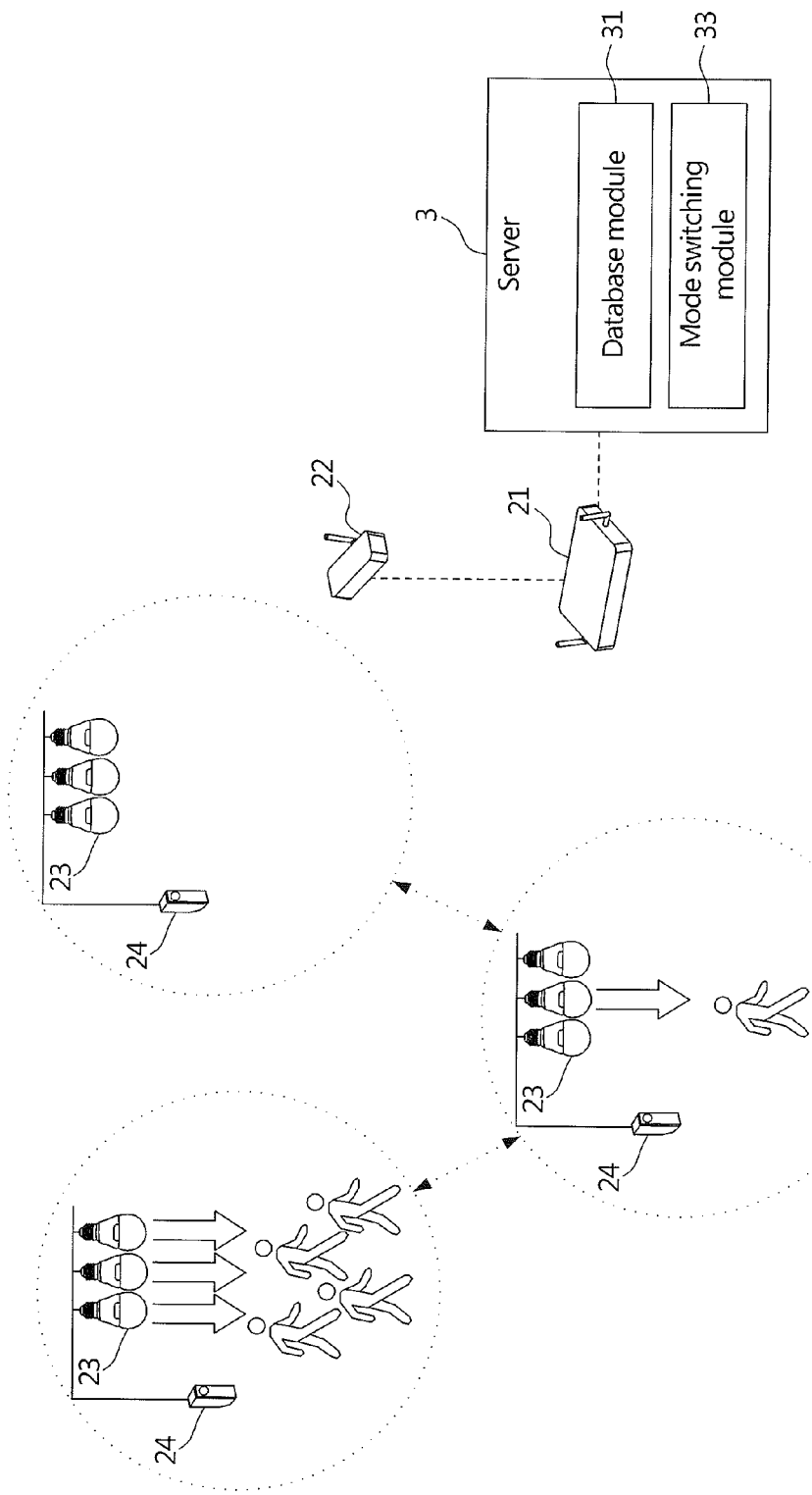
FIG. 7 shows a schematic diagram of lighting control using big data collection implemented by a sensor of a luminaire assembly according to an embodiment of the present invention.

Referring further to FIG. 7, there is shown a schematic diagram of lighting control using big data collection implemented by the sensor 24 of the luminaire assembly 2 shown in FIG. 1. As described above, the sensors 24 may detect people flow to transfer to the server 3 to store as the operating data in the database module 31; the mode switching module 33 may analyze the people flow to control the luminaire assemblies 2 (comprising the luminaires 23) to automatically switch between the operating modes comprising a busy mode, a sensor mode, a silent mode, and a security mode. Specifically, the parameter settings stored in the database module 31 further comprise a time interval, a high threshold, and a low threshold. If a sensor 24 detects there is a person, the sensor 24 is triggered one time and transfers the detected data to the servers 3.

When the number of times of the sensors 24 being triggered is larger than the high threshold in the time interval, representing the heavy people flow, the mode switching module 33 controls the luminaires 23 to switch to the busy mode for keep the dimming level in the maximum dimming level. When the number of times of the sensors 24 being triggered is less than the high threshold but larger than the low threshold in the time interval, representing the normal people flow, the mode switching module 33 controls the luminaires 23 to switch to the sensor mode for adjusting the dimming level according to the amount of people so that it may save power. When the number of times of the sensors 24 being triggered is less than the low threshold in the time interval, representing the light people flow, the mode switching module 33 controls the luminaires 23 to switch to the silent mode for adjusting the dimming level to the standby dimming level or the minimum dimming level (i.e. turning off the luminaires 23). Moreover, the user may set the security mode performed in a specific time, for example, after hours. When the security mode is performed, the mode switching module 33 will turn off the luminaires 23, and the sensors 24 will keep on detecting. When the sensors 24 detect there is a person, the mode switching module 33 may control the luminaires 23 to very fast turn on to deter the intruder, activate peripheral devices such as an alarm bell and a camera, and transfer this event to the smart phone 1 of the user.

Although the aforementioned embodiments use the sensors 24 to detect the people flow for light control of the luminaires 23, they are not intended to limit the present invention. For example, the sensors may comprise a temperature sensor and/or a humidity sensor; the luminaires may be replaced with other appliances such as air conditioners and electric fans.

Figure 8:
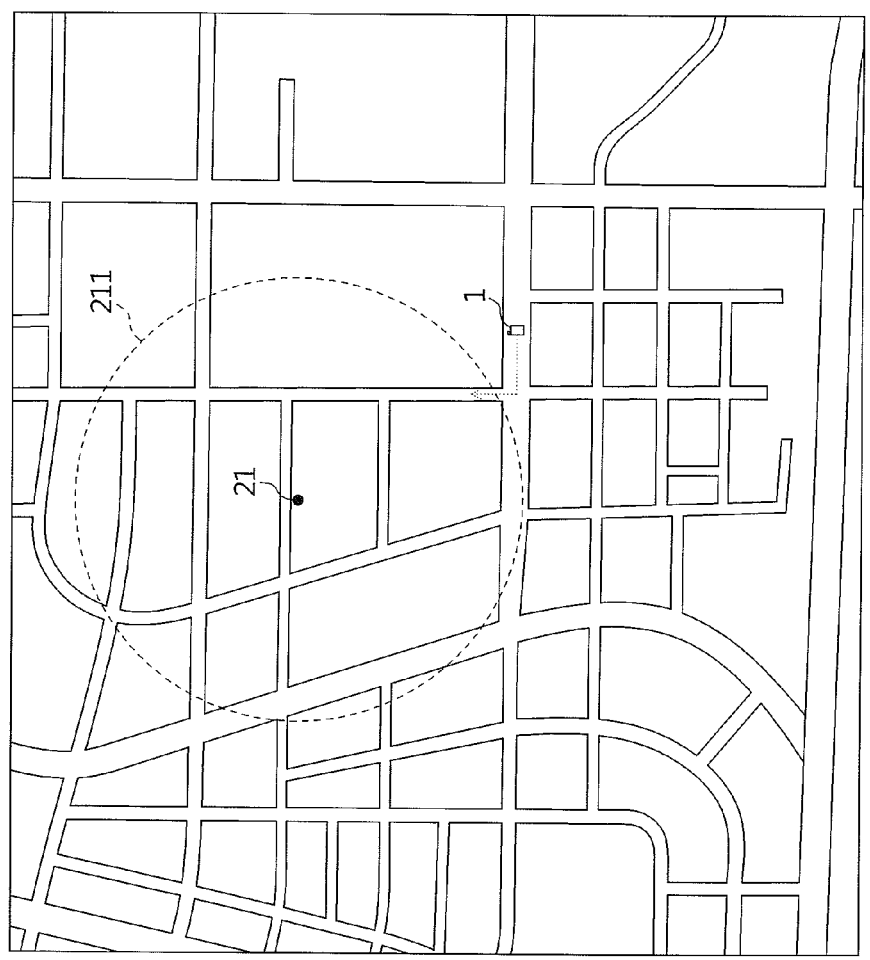
FIG. 8 shows a schematic diagram of a GPS-auto-on-off function according to an embodiment of the present invention.

Referring further to FIG. 8, there is shown a schematic diagram of a GPS-auto-on-off function of the lighting control system shown in FIG. 1. As described above, the GPS module 35 compares a GPS location of the smart phone 1 with the GPS locations of the luminaire assemblies 2 to automatically turn on or off the luminaire assemblies 2 to provide the GPS-auto-on-off function. In the embodiment, a GPS location of a gateway 21 is stored in the database module 31. When the user carrying the smart phone 1 enters a user-defined range 211 of the position of the gateway 21, and there are no other users carrying other smart phones in the range 211, the server 3 turns on the assigned luminaires 23 right after the GPS module 35 receives the first reported GPS location of the smart phone 1 and compares the GPS location of the gateway 21 to decide that the smart phone 1 is in the range 211. When there is more than one person in the range 211, any entrance and exit will not change the GPS-auto-on-off status. That is, the GPS-auto-on-off function is operated by the reported location from the smart phone 1, and the auto-on-off of the assigned luminaires is decided by the status change of the occupancy in the range 211 of the gateway 21. Furthermore, in the embodiment, the user-defined range 211 is a circle having a user-defined radius.

The server 3 knows how many people are in the range 211. With the users' pressing the sign-in button on the client apps 11 on the smart phones 1 in the range 211, the server 3 can record the sign-in and sign-out times thereof (i.e. the users' presence histories) to the database module 31. The assigned master user may be aware of the presence details (i.e. the sign-in and sign-out times) of the other users at the specific gateway location by extracting the information stored in the database module 31. This sign-in function is pure software without extra cost for accessories, wiring, and hardware.

It will be apparent to those skilled in the art that various modifications and variations can be made to the structure of the present invention without departing from the scope or spirit of the present invention. In view of the foregoing, it is intended that the present invention cover modifications and variations of this invention provided they fall within the scope of the following claims and their equivalents.

What is claimed is:

1. A lighting control system comprising:
a smart device comprising a client app installed thereon and a light sensor disposed thereon;
at least one luminaire assembly comprising a plurality of luminaires set into at least one luminaire group via the client app to be controlled in groups; and
a server communicatively connected to the smart device and the at least one luminaire assembly, the server comprising:
a database module for storing parameter settings set via the client app, operating data gathered from the at least one luminaire assembly, and at least one GPS location of the at least one luminaire assembly;

a brightness control module for controlling the at least one luminaire assembly to provide different brightness variations at different times according to the parameter settings obtained from the database module and an ambient variation detected by the at least one luminaire assembly;

a mode switching module for controlling the at least one luminaire assembly to switch between different operating modes according to the operating data obtained from the database module and the ambient variation detected by the at least one luminaire assembly;

a brightness compensation module for compensating the brightness of the at least one luminaire assembly by comparing a luminance setting of the at least one luminaire assembly with an ambient luminance detected by the light sensor of the smart device; and a GPS module for comparing a GPS location of the smart device with the at least one GPS location of the at least one luminaire assembly to decide whether the smart device is in a user-defined range of the at least one luminaire assembly to automatically turn on or off the at least one luminaire assembly.

2. The lighting control system of claim 1, wherein each luminaire assembly further comprises:

a gateway communicatively connected to the server;

at least one lighting controller communicatively connected to the gateway and electrically connected to at least one of the plurality of luminaires; and at least one sensor electrically connected to the at least one lighting controller for detecting the ambient variation.

3. The lighting control system of claim 2, wherein the client app comprises:

a group page for setting and turning on or off the at least one luminaire group;

a schedule page for setting the parameter settings to arrange actions of the at least one luminaire group;

an advanced page for setting a software electric meter and a connection between the gateway and the at least one lighting controller; and a setting page for setting parameters related to the group page, the schedule page, and the advanced page.

4. The lighting control system of claim 3, wherein the group page comprises at least one group control button displayed thereon each for controlling corresponding one of the at least one luminaire group to turn on or off or dim.

5. The lighting control system of claim 3, wherein the software electric meter is provided to calculate energy consumption of the at least one luminaire assembly and set a usage limitation on the energy consumption of the at least one luminaire assembly.

6. The lighting control system of claim 2, wherein the at least one sensor detects people flow to transfer to the server to store as the operating data in the database module, and wherein the mode switching module analyzes the people flow to control the at least one luminaire assembly to automatically switch between the operating modes comprising a busy mode, a sensor mode, a silent mode, and a security mode.

7. The lighting control system of claim 2, wherein the at least one GPS location of the at least one luminaire assembly comprises a GPS location of the gateway, and wherein the user-defined range of the at least one luminaire assembly comprises a user-defined range of the gateway's location.

8. The lighting control system of claim 7, wherein the user-defined range of the gateway's location comprises a circle having a user-defined radius.

9. The lighting control system of claim 1, wherein the client app activates the light sensor of the smart device to periodically detect the ambient luminance, and activates a network communication function of the smart device to communicatively connect to the server to compare the ambient luminance with the luminance setting to compensate the brightness of the at least one luminaire assembly.

10. The lighting control system of claim 1, wherein the server is wirelessly connected to the smart device and the at least one luminaire assembly.

11. The lighting control system of claim 1, wherein the parameter settings and the operating data are stored for different users in the database module.

12. The lighting control system of claim 1, wherein the smart device comprises a smart phone, a phablet, or a tablet.

13. The lighting control system of claim 1, wherein the parameter settings comprises:

a time range setting for determining when the luminaire group is turned on or off or dimmed;

a brightness variation setting for determining the dimming of brightness of the luminaire group; and a group range setting for determining which luminaire is set into the luminaire group.

14. The lighting control system of claim 1, wherein the client app further comprises a sign-in button, wherein when the sign-in button is pressed and the smart device is in the user-defined range, the server records sign-in and sign-out times of the smart device to the database module, and wherein the server provides how many smart devices are in the user-defined range by extracting information about the sign-in and sign-out times stored in the database module.

* * * * *